(12) United States Patent
Wu et al.

(10) Patent No.: US 7,160,360 B2
(45) Date of Patent: Jan. 9, 2007

(54) PURIFICATION OF HYDRIDE GASES

(75) Inventors: Dingjun Wu, Macungie, PA (US); Timothy Christopher Golden, Allentown, PA (US); Chun Christine Dong, Macungie, PA (US); Paula Jean Battavio, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 250 days.

(21) Appl. No.: 10/730,506

(22) Filed: Dec. 8, 2003

(65) Prior Publication Data

US 2005/0120877 A1 Jun. 9, 2005

(51) Int. Cl.
*B01D 53/02* (2006.01)

(52) U.S. Cl. .............. 95/117; 95/138; 95/900; 95/901

(58) Field of Classification Search .......... 95/117–123, 95/126, 138, 139, 900–902, 126.1; 96/108, 96/134, 135, 153, 142–144, 154; 423/219, 423/220, 230, 231; 502/416, 417, 428
See application file for complete search history.

(56) References Cited

U.S. PATENT DOCUMENTS

| | | | | |
|---|---|---|---|---|
| 3,361,531 A | * | 1/1968 | Erb et al. .................... | 423/219 |
| 3,849,539 A | * | 11/1974 | Coleman .................... | 423/219 |
| 4,077,779 A | * | 3/1978 | Sircar et al. .................... | 95/26 |
| 4,421,533 A | * | 12/1983 | Nishino et al. ............... | 95/138 |
| 4,433,981 A | | 2/1984 | Slaugh et al. | |
| 4,761,395 A | | 8/1988 | Tom et al. | |
| 4,795,735 A | * | 1/1989 | Liu et al. .................... | 502/415 |
| 4,869,883 A | * | 9/1989 | Thorogood et al. ......... | 423/219 |
| 4,950,419 A | | 8/1990 | Tom et al. | |
| 4,983,363 A | | 1/1991 | Tom et al. | |
| 5,204,075 A | * | 4/1993 | Jain et al. .................... | 423/219 |
| 5,314,853 A | * | 5/1994 | Sharma ....................... | 502/66 |
| 5,531,971 A | | 7/1996 | Tom et al. | |
| 5,536,302 A | | 7/1996 | Golden et al. | |
| 5,716,588 A | | 2/1998 | Vergani et al. | |
| 5,779,767 A | * | 7/1998 | Golden et al. ............... | 95/96 |
| 5,997,829 A | * | 12/1999 | Sekine et al. ............... | 423/210 |
| 6,017,502 A | * | 1/2000 | Carrea et al. ............... | 423/230 |
| 6,110,258 A | | 8/2000 | Fraenkel et al. | |
| 6,113,869 A | * | 9/2000 | Jain et al. .................... | 423/219 |
| 6,190,627 B1 | * | 2/2001 | Hoke et al. .................. | 423/219 |
| 6,241,955 B1 | | 6/2001 | Alvarez, Jr. | |
| 6,395,070 B1 | | 5/2002 | Bhadha et al. | |
| 6,428,612 B1 | * | 8/2002 | McPhilmy et al. ........... | 96/132 |
| 6,461,411 B1 | | 10/2002 | Watanabe et al. | |
| 6,511,528 B1 | * | 1/2003 | Lansbarkis et al. .......... | 95/118 |
| 6,524,544 B1 | | 2/2003 | Alvarez, Jr. et al. | |
| 6,638,340 B1 | * | 10/2003 | Kanazirev et al. ............ | 95/96 |
| 2002/0034467 A1 | * | 3/2002 | Otsuka et al. ............... | 423/219 |
| 2002/0082168 A1 | * | 6/2002 | Graham et al. ............. | 502/416 |
| 2003/0097929 A1 | | 5/2003 | Watanabe et al. | |

FOREIGN PATENT DOCUMENTS

| | | | |
|---|---|---|---|
| EP | 0 484 301 B1 | 10/1994 | |
| EP | 0 470 936 B1 | 12/1994 | |
| EP | 1 176 120 A1 | 1/2002 | |
| JP | 02184340 A * | 7/1990 | ................. 502/324 |
| JP | 9-142833 | 6/1997 | |
| WO | WO 97/06104 | 2/1997 | |
| WO | WO 00/23174 | 4/2000 | |
| WO | WO 01/68241 A2 | 9/2001 | |
| WO | WO 03/037485 A1 | 5/2003 | |

* cited by examiner

*Primary Examiner*—Robert A. Hopkins
(74) *Attorney, Agent, or Firm*—Geoffrey L. Chase

(57) ABSTRACT

Purification material for removing a contaminant from an impure hydride gas comprising an adsorbent comprising a reduced metal oxide on a porous support and a desiccant. The porous support may be selected from the group consisting of activated carbon, alumina, silica, zeolite, silica alumina, titania, zirconia, and combinations thereof. The reduced metal oxide may comprise one or more metals selected from the group consisting of Group I alkali metals (lithium, sodium, potassium, rubidium, and cesium), Group II alkaline earth metals (magnesium, calcium, strontium, and barium), and transition metals (manganese, nickel, zinc, iron, molybdenum, tungsten, titanium, vanadium, cobalt, and rhodium). The desiccant may be selected from the group consisting of hygroscopic metal salts, zeolites, single metal oxides, mixed metal oxides, and combinations thereof.

5 Claims, 2 Drawing Sheets

PURIFICATION OF HYDRIDE GASES

BACKGROUND OF THE INVENTION

Gaseous hydride compounds are widely used as precursors in chemical vapor deposition (CVD) processes for the manufacture of microelectronic components. The growth and quality of thin films formed from gaseous hydride precursors are highly dependent upon the purity of the precursor compounds and require extremely low concentrations of impurities in the precursors. Removal of impurities such as oxygen, carbon dioxide, and water to concentrations in the parts per billion (ppb) range is required for many ultra-high purity precursors. The cost-effective removal of impurities to these ppb levels is very difficult.

Ultra-high purity ammonia and related hydride gases, such as arsine and phosphine, are important precursors in CVD processes. For example, ammonia is used as a precursor to form silicon nitride as an inter-layer dielectric and passivation layer and to deposit metal nitrides for high performance transistors, light emitting diodes, lasers, and photodiodes. The electrical properties of semiconductor devices are greatly dependent on the level of impurities in the nitride layers, and the level of these impurities is directly related to the purity of the source ammonia used in the layer manufacturing process. Oxygen is a particularly detrimental impurity in ammonia because of the high reactivity of oxygen, and the maximum allowable concentration of oxygen in ultra-high purity ammonia is typically about 100 parts per billion by volume (ppbv).

Many hydride gas purification processes remove impurities by contacting the hydride gas with porous adsorbents and getter materials containing various metal oxides. These processes preferably utilize the adsorbent and getter materials in cyclic operation wherein spent adsorbent and getter materials are regenerated offline and returned to service. Regeneration typically is effected by heating in a reducing atmosphere containing hydrogen or other reducing agents.

As purity requirements for metal hydride precursors used in CVD processes become more stringent, there is a need for improved adsorbents, getters, and processes for removing impurities from precursor feed materials, particularly when the impurities include oxygen, carbon dioxide, and water. These improved processes should include longer operating time between regenerations as well as simpler and more effective regeneration methods. These needs are addressed by embodiments of the present invention described below and defined by the claims that follow.

BRIEF SUMMARY OF THE INVENTION

Embodiments of the invention relate to a purification material for removing a contaminant from an impure hydride gas comprising (a) an adsorbent comprising a reduced metal oxide on a porous support; and (b) a desiccant. The porous support may be selected from the group consisting of activated carbon, alumina, silica, zeolite, silica alumina, titania, zirconia, and combinations thereof. In a preferred embodiment, activated carbon is used as the porous support. The reduced metal oxide may comprise one or more metals selected from the group consisting of Group I alkali metals (lithium, sodium, potassium, rubidium, and cesium), Group II alkaline earth metals (magnesium, calcium, strontium, and barium), and transition metals (manganese, nickel, zinc, iron, molybdenum, tungsten, titanium, vanadium, cobalt, and rhodium). The desiccant may be selected from the group consisting of hygroscopic metal salts, zeolites, single metal oxides, mixed metal oxides, and combinations thereof.

The adsorbent and the desiccant may be combined by (1) mixing the adsorbent with the desiccant to provide a mixed purification material or (2) forming layers of adsorbent and the desiccant to provide a layered purification material. Preferably, the adsorbent has a surface area in the range of about 250 to about 1200 $m^2/g$.

An embodiment of the invention includes a method of making a purification material for the removal a contaminant from an impure hydride gas comprising
  (a) dissolving one or more metal salts in a solvent to provide a metal salt solution;
  (b) contacting a porous support with the metal salt solution to provide an impregnated porous support;
  (c) heating the impregnated porous support to remove excess solvent and decompose the metal salt to a metal oxide, thereby providing a metal oxide deposited on a porous support;
  (d) heating the metal oxide deposited on the porous support in a reducing atmosphere to provide a reduced metal oxide on the porous support, and cooling the metal oxide to yield a reduced metal oxide adsorbent material; and
  (e) combining the reduced metal oxide adsorbent material with a desiccant material to provide the purification material for the removal of contaminants from hydride gases.

The porous support in this embodiment may be selected from the group consisting of activated carbon, alumina, silica, zeolite, silica alumina, titania, zirconia, and combinations thereof. The reduced metal oxide may comprise one or more metals selected from the group consisting of Group I alkali metals (lithium, sodium, potassium, rubidium, and cesium), Group II alkaline earth metals (magnesium, calcium, strontium, and barium), and transition metals (manganese, nickel, zinc, iron, molybdenum, tungsten, titanium, vanadium, cobalt, and rhodium). The desiccant may be selected from the group consisting of hygroscopic metal salts, zeolites, single metal oxides, mixed metal oxides, and combinations thereof.

The reduced metal oxide adsorbent material and the desiccant may be combined by (1) mixing the reduced metal oxide adsorbent material with the desiccant to provide a mixed purification material or (2) forming layers of the reduced metal oxide adsorbent material and the desiccant to provide a layered purification material. Preferably, the reduced metal oxide adsorbent material has a surface area in the range of about 250 to about 1200 $m^2/g$.

Another embodiment of the invention includes a method of making a purification material for the removal of a contaminant from an impure hydride gas comprising
  (a) dissolving one or more metal salts in a solvent to provide a metal salt solution;
  (b) contacting the metal salt solution with an activated carbon support to provide an impregnated activated carbon support;
  (c) heating the impregnated porous support to remove excess solvent and decompose the metal salt to a metal oxide, thereby providing a metal oxide deposited on an activated carbon support;
  (d) heating the metal oxide deposited on the activated carbon support to provide a reduced metal oxide on the activated carbon support, and cooling the metal oxide to yield a reduced metal oxide adsorbent material; and (e) combining the reduced metal oxide adsorbent material with a desiccant material to provide the purification material.

The heating of the metal oxide deposited on the activated carbon support may be effected at an operating condition selected from the group consisting of (1) evacuating gas from the metal oxide deposited on the activated carbon support, (2) contacting the metal oxide deposited on the activated carbon with an inert atmosphere, and (3) contacting the metal oxide deposited on the activated carbon with a reducing atmosphere.

In this embodiment, the reduced metal oxide may comprise one or more metals selected from the group consisting of Group I alkali metals (lithium, sodium, potassium, rubidium, and cesium), Group II alkaline earth metals (magnesium, calcium, strontium, and barium), and transition metals (manganese, nickel, zinc, iron, molybdenum, tungsten, titanium, vanadium, cobalt, and rhodium). The desiccant may be selected from the group consisting of hygroscopic metal salts, zeolites, single metal oxides, mixed metal oxides, and combinations thereof. The reduced metal oxide adsorbent material and the desiccant may be combined by (1) mixing the reduced metal oxide adsorbent material with the desiccant to provide a mixed purification material or (2) forming layers of the reduced metal oxide adsorbent material and the desiccant to provide a layered purification material.

In an alternative embodiment, the invention relates to a method for purifying a hydride gas containing at least one contaminant, which method comprises (a) providing a purification material comprising (1) an adsorbent comprising a reduced metal oxide on a porous support and (2) a desiccant;

(b) contacting the hydride gas with the purification material to remove at least a portion of the contaminant; and (c) separating the hydride gas from the purification material to provide a purified hydride gas and a spent purification material.

In this embodiment, the porous support may be selected from the group consisting of activated carbon, alumina, silica, zeolite, silica alumina, titania, zirconia, and combinations thereof. The reduced metal oxide may comprise one or more metals selected from the group consisting of Group I alkali metals (lithium, sodium, potassium, rubidium, and cesium), Group II alkaline earth metals (magnesium, calcium, strontium, and barium), and transition metals (manganese, nickel, zinc, iron, molybdenum, tungsten, titanium, vanadium, cobalt, and rhodium). The desiccant may be selected from the group consisting of hygroscopic metal salts, zeolites, single metal oxides, mixed metal oxides, and combinations thereof. The adsorbent and the desiccant may be combined by (1) mixing the adsorbent with the desiccant to provide a mixed purification material or (2) forming layers of the adsorbent and the desiccant to provide a layered purification material. Preferably, the adsorbent may have a surface area in the range of about 250 to about 1200 $m^2/g$.

The at least one contaminant may be selected from the group consisting of oxygen, carbon dioxide, and water. In this embodiment, the purification material may be provided by (a) dissolving one or more metal salts in a solvent to provide a metal salt solution;

(b) contacting a porous support with the metal salt solution to provide an impregnated porous support;

(c) heating the impregnated porous support to remove excess solvent and decompose the metal salt to a metal oxide, thereby providing a metal oxide deposited on a porous support;

(d) heating the metal oxide deposited on the porous support in a reducing atmosphere to provide a reduced metal oxide on the porous support, and cooling the metal oxide to yield a reduced metal oxide adsorbent material; and (e) combining the reduced metal oxide adsorbent material with a desiccant material to provide the purification material.

In this embodiment, the spent purification material may be regenerated by heating in a reducing atmosphere.

An alternative method of providing the purification material comprises (a) dissolving one or more metal salts in a solvent to provide a metal salt solution;

(b) contacting the metal salt solution with an activated carbon support to provide an impregnated activated carbon support;

(c) heating the impregnated activated carbon support to remove excess solvent and decompose the metal salt to a metal oxide, thereby providing a metal oxide deposited on an activated carbon support;

(d) heating the metal oxide deposited on the activated carbon support to provide a reduced metal oxide on the activated carbon support, and cooling the metal oxide to yield a reduced metal oxide adsorbent material; and (e) combining the reduced metal oxide adsorbent material with a desiccant material to provide the purification material.

In this alternative, the spent purification material may be regenerated by heating in combination with an operating condition selected from the group consisting of (1) evacuating gas from the spent purification material, (2) contacting the spent purification material with an inert atmosphere, and (3) contacting the spent purification material with a reducing atmosphere.

The hydride gas to be purified may be selected from the group consisting of hydrogen, ammonia, arsine, phosphine, germane, silane, disilane, diborane, and alkyl or halide derivatives thereof. The at least one contaminant may be selected from the group consisting of oxygen, carbon dioxide, and water.

In a final embodiment, the invention includes a purified hydride gas produced by the method comprising (a) providing a purification material comprising (1) an adsorbent comprising a reduced metal oxide on a porous support and (2) a desiccant;

(b) providing a contaminated hydride gas containing at least one contaminant;

(c) contacting the contaminated hydride gas with the purification material to remove at least a portion of the contaminant; and (d) separating the hydride gas from the purification material to provide a purified hydride gas and a spent purification material.

The hydride gas may be selected from the group consisting of hydrogen, ammonia, arsine, phosphine, germane, silane, disilane, diborane, and alkyl or halide derivatives thereof. The at least one contaminant may be selected from the group consisting of oxygen, carbon dioxide, and water. Preferably, the adsorbent has surface area in the range of about 250 to about 1200 $m^2/g$.

DETAILED DESCRIPTION OF THE INVENTION

Figure 1:
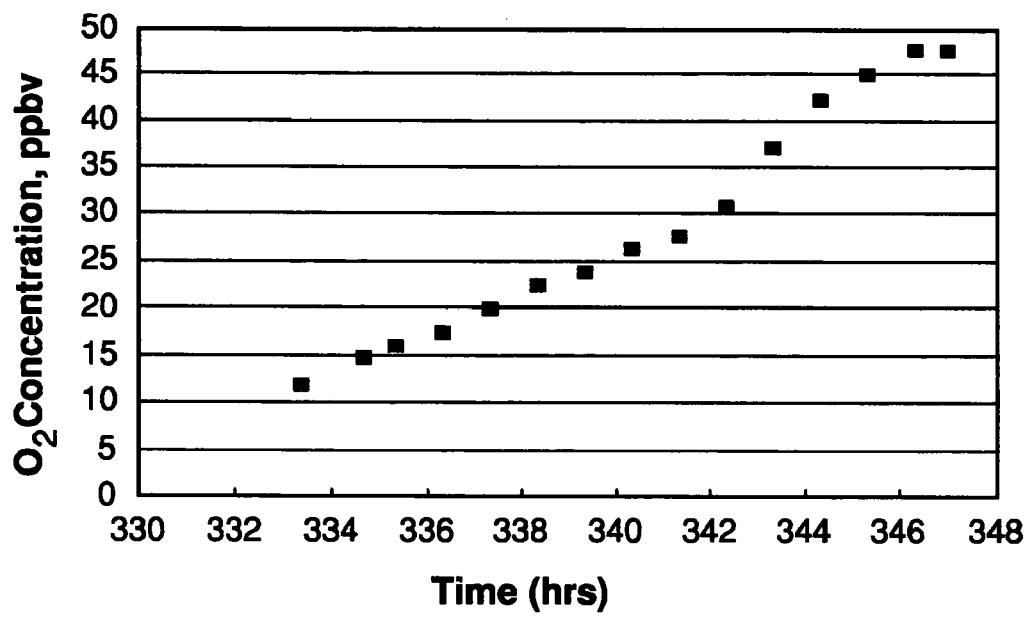
FIG. 1 is an oxygen breakthrough curve for the adsorption of oxygen on MnO impregnated activated carbon from a mixture of 0.45 ppmv oxygen and 0.38 ppmv water in ammonia.

Embodiments of the present invention relate to processes for removing impurities such as oxygen, carbon dioxide, and water from hydride gases to levels below 100 parts per billion by volume (ppbv). Hydride gases that may be purified using embodiments of the invention include, for example, hydrogen ($H_2$), ammonia ($NH_3$), arsine ($AsH_3$), phosphine ($PH_3$), germane ($GeH_4$), silane ($SiH_4$), disilane ($Si_2H_6$), diborane ($B_2H6$), and alkyl or halide derivatives thereof. The hydride gas is purified by contacting the gas with a purification material comprising a reduced metal oxide adsorbent and a desiccant; the metal oxide preferably is supported on a high surface area support selected from activated carbon, alumina, silica, zeolite, silica alumina, titania, zirconia, and mixtures thereof.

The supported metal oxide may be prepared using well-known impregnation methods such as soaking, incipient wetness technique, or vacuum impregnation. Due to the hydrophobic nature of carbon, vacuum impregnation is recommended for carbon support. The metal oxides may comprise one or more metals selected from the group consisting of Group I alkali metals (lithium, sodium, potassium, rubidium, and cesium) Group II alkaline earth metals (magnesium, calcium, strontium, and barium), and transition metals (manganese, nickel, zinc, iron, molybdenum, tungsten, titanium, vanadium, cobalt, and rhodium).

Metal salts, such as nitrates, oxalates, benzoates, lactates, tartrates, acetates, succinates, or formates, may be dissolved in appropriate solvents and used as precursors of the corresponding metal oxides. Appropriate solvents may include, for example, water, methanol, ethanol, or acetone The metal oxide loading may be about 10% to about 90% by weight; 30 to 40% by weight is a preferred range. The surface area of the support should be at least 100 $m^2/g$ and may be in the range of 800 to 1500 $m^2/g$.

An adsorbent comprising at least one reduced metal oxide on a selected porous support may be prepared using the following exemplary steps:

(1) At least one selected metal salt is dissolved in water or other suitable solvent such as methanol, ethanol, or acetone. The concentration of the metal salt is selected depending on the salt solubility and the desired metal oxide loading on the support.

(2) The selected porous support is contacted with the solution made in step 1 and excess solution is decanted from the mixture to provide a porous support impregnated with salt solution.

(3) The impregnated support is initially dried by purging with a dry gas at a temperature of about 50° C. to about 120° C. for about 2 to 24 hours. Vacuum may be used to increase the rate and the efficiency of the initial drying process.

(4) The dried support is activated at a temperature of about 100 to 500° C. for at least 1 hour under vacuum or an inert atmosphere such as nitrogen or helium. The activation temperature may be in the range of 200 to 500° C. and should be sufficiently high to decompose the salt to the corresponding oxide and low enough to avoid metal sintering.

Alternatively or additionally, the metal oxide may be activated in a reducing gas containing hydrogen, carbon monoxide, ammonia, hydrazine, or other appropriate reducing agent(s) at a temperature of about 100° C. to 500° C. for at least 1 hr. The temperature should be high enough to decompose the salt to its corresponding oxide and low enough to avoid metal sintering.

The adsorbent prepared as described above thus comprises at least one reduced metal oxide on a porous support. A reduced metal oxide is defined herein as a metal oxide having oxide species in one or more oxidation states wherein at least a portion of the oxide species exists in an oxidation state or states lower than the highest possible oxidation state of the metal and higher than the lowest oxidation state, i.e., the totally reduced elemental metal. The reduced metal oxide may include some metal in the highest possible oxidation state and/or some elemental metal. The reduced metal oxide by definition does not consist completely of elemental metal in its lowest oxidation state.

The use of the indefinite articles "a" and "an" means one or more when applied to any feature of the present invention described in the specification and claims. The use of "a" and "an" does not limit the meaning to a single feature unless such a limit is specifically stated.

The surface area of the adsorbent prepared as described above, which comprises at least one reduced metal oxide on a porous support, may be in the range of 100 to 1500 $m^2/g$ and preferably is in the range of 250 to 1200 $m^2/g$. The surface area may be measured by nitrogen adsorption at 77° K using the standard BET method.

The adsorbent described above may be used, for example, in the removal of oxygen and carbon dioxide from ammonia. In this application, impure ammonia containing at least oxygen and carbon dioxide as impurities or contaminants is contacted with the adsorbent at ambient temperature and a pressure between 1 atm and the ammonia gas cylinder pressure (8.8 atm at 21° C.). It is believed that oxygen and carbon dioxide are removed by reaction with the reduced metal oxide. After the reaction, the metal oxide forms a higher oxidation state, possibly including peroxide or superoxide.

It has been found during experimental work supporting this invention that water may be formed during the removal of oxygen from ammonia by contacting ammonia with reduced metal oxides. Similar water formation also may occur with gaseous metal hydrides. This water may be removed by combining the reduced metal oxide adsorbent with a desiccant material to provide a combined purification material capable of removing at least oxygen and water from the hydride gas to provide a purified hydride gas containing less than 100 ppbv of impurities. The adsorbent (i.e., the reduced metal oxide on a porous support) and the desiccant may be combined by (1) mixing the adsorbent with the desiccant to provide a mixed purification material or (2) forming layers of the adsorbent and the desiccant to provide a layered purification material. In the layered configuration, the purification material preferably comprises a layer of adsorbent followed by a layer desiccant contained in an adsorbent vessel. Alternatively, each layer may be housed in a separate vessel if desired.

Typically, the purification material may contain from 10 to 50% by volume of the adsorbent material and from 50 to 90% by volume of the desiccant material. Preferably, the purification material contains 10 to 30% by volume of the adsorbent material and 70 to 90% by volume of the desiccant material.

Any appropriate desiccant may be used to combine with the adsorbent (i.e., the reduced metal oxide on a porous support) to provide the purification material described above. A desiccant is defined herein as a solid substrate capable of removing water from a gas stream and may be selected from (but is not limited to) hygroscopic metal salts, zeolites, single or mixed metal oxides, and combinations thereof. The desiccant preferably is regenerable at the conditions required to regenerate the reduced metal oxide adsorbent.

Anhydrous calcium sulfate (sold, for example, under the tradename Drierite) is a useful desiccant for this application. Water is absorbed as water of hydration and is chemically bound to the calcium sulfate; heating to temperatures of at least 200° C. to 250° C. will break these bonds and release absorbed moisture. Types 4A and 5A zeolites are alternative dessicants that may be used in the invention, and may be regenerated at temperatures of 400° C. to 550° C.

Single or mixed metal oxides may be used as the desiccant wherein the metal oxides are applied to a porous support such as alumina. Barium oxide is a representative metal oxide and a combination of magnesium oxide and potassium oxide is a representative mixed metal oxide that may be used as the dessicant in this process. These supported metal oxides may be prepared by the same methods described above for the adsorbent material, except that when the metal oxides are used as desiccants the porous support preferably is an inorganic material.

Non-regenerable or difficult-to-regenerate desiccants may be used in combination with the reduced metal oxide adsorbents described above, but in this embodiment the combined purification material will comprise the adsorbent material contained in a first vessel in combination with the desiccant contained in a second vessel. The vessels would be operated in series and the adsorbent material may be regenerated in the first vessel while the desiccant in the second vessel is replaced.

The removal of oxygen by the adsorbent converts the reduced metal oxide to a higher oxidation state or states and eventually the metal oxide becomes spent, i.e., becomes incapable of removing oxygen and other impurities to the required low concentrations. The spent adsorbent may be regenerated by heating to temperatures in the range of 100° C. to 500° C. while purging with a reducing gas comprising, for example, hydrogen, carbon monoxide, ammonia, hydrazine, or any other appropriate reducing agent(s). For regenerating adsorbents having a non-carbon support material, e.g., alumina, silica, zeolite, silica alumina, titania, and zirconia, a reducing gas is preferred, and for adsorbents having a carbon support material such as activated carbon, a reducing gas is optional. The activated carbon-based metal oxide adsorbent may be regenerated by purging with an inert gas and/or by evacuation, and may not require the use of a reducing gas during regeneration.

Regenerable desiccants (for example, hygroscopic metal salts or zeolites) used in the purification material may be regenerated by heating and purging with any dry gas, and therefore any dry purge gas used for adsorbent regeneration will be sufficient for regenerating the desiccant. Typically, the regeneration conditions required for adsorbent regeneration will also regenerate the desiccant. The combined adsorbent-desiccant purification material described herein may be regenerated by purging with a dry inert gas (for carbon-based adsorbents) or a dry reducing gas (for non-carbon-based adsorbents) at temperatures in the range of 400° C. to 500° C. Typically, the amount of purge gas required is in the range of 0.1 to 5 cc/(min-g adsorbent) for a duration of at least 4 hours.

The following Examples illustrate embodiments of the present invention but do not limit the invention to any of the specific details described therein.

EXAMPLE 1

A supported metal oxide adsorbent was prepared by impregnating 40 grams of 6×12 mesh coconut shell carbon (Type PCB from Calgon) with 28 cc of 50 wt % $Mn(NO_3)_2$ solution. The sample was air dried at ambient temperature, then activated at 400° C. in $N_2$ for 16 hours. The activation treatment decomposed the nitrate to the oxide and the reducing potential of the carbon resulted in a supported reduced MnO on carbon. The final loading of Mn on the carbon was 2.0 mmole/g.

Adsorption of $O_2$ was conducted on this material in a standard volumetric adsorption apparatus at 30° C. At an $O_2$ pressure of 0.0002 atm, the $O_2$ uptake rate and equilibrium capacity were determined. The equilibrium capacity was 0.21 mmole $O_2$/gram of adsorbent. Based on the loading of Mn, this material adsorbed 0.105 moles $O_2$/mole of Mn. The spent adsorbent was regenerated at 400° C. in flowing nitrogen at 2 cc/g-min and oxygen adsorption was repeated as above. The regeneration/adsorption cycle was repeated two more times. The resulting uptake data are given in Table 1 and indicate that the oxygen capacity is regained following each regeneration of the adsorbent.

TABLE 1

Oxygen Uptake vs Time For Successively Regenerated MnO on Activated Carbon
(Uptake as Amount Adsorbed/Amount Adsorbed at Equilibrium)

| Time (min.) | First Regeneration | Second Regeneration |
|---|---|---|
| 0.08 | 0.199 | 0.211 |
| 0.17 | 0.336 | 0.340 |
| 0.25 | 0.468 | 0.451 |
| 0.33 | 0.556 | 0.544 |
| 0.50 | 0.649 | 0.653 |
| 0.75 | 0.757 | 0.761 |
| 1.00 | 0.821 | 0.824 |
| 1.50 | 0.891 | 0.898 |
| 2.00 | 0.924 | 0.931 |
| 3.00 | 0.957 | 0.965 |
| 4.00 | 0.972 | 0.978 |
| 5.00 | 0.982 | 0.983 |
| 6.00 | 0.985 | 0.986 |
| 7.00 | 0.988 | 0.988 |
| 10.00 | 0.991 | 0.991 |
| 15.00 | 0.992 | 0.992 |
| 20.00 | 0.994 | 0.994 |
| 25.00 | 0.995 | |
| 30.00 | 0.995 | 0.995 |
| 40.00 | 0.997 | 0.997 |
| 50.00 | 0.998 | 0.998 |

EXAMPLE 2

A commercially-available MnO-based catalyst, which is essentially an unsupported metal oxide material, was activated in 4 vol % $H_2$ in $N_2$ at 400° C. for 16 hours and the adsorption of $O_2$ was conducted as described above. The $O_2$ capacity measured at 0.0002 atm was 0.23 mmole/g. Since this material is pure MnO, the Mn loading on this material is 0.014 moles Mn/g of catalyst. Based on this Mn loading, the material adsorbed 0.016 moles $O_2$/mole of Mn. Clearly, the supported MnO adsorbent of Example 1 provides a higher $O_2$/Mn ratio than the unsupported oxide material. As shown in Table 2, the $O_2$ capacity on a Mn loading basis of the supported MnO adsorbent is about 7.5 times higher than that of the unsupported MnO material. In addition, the activated carbon-supported material of Example 1 required only $N_2$ for activation, while the unsupported MnO material requires reduction in $H_2$ for activation.

TABLE 2

Comparison of Supported and Unsupported MnO Adsorbents

| | Oxygen Capacity @ 30° C., 0.0002 atm | |
|---|---|---|
| Adsorbent | (mmole/g adsorbent) | moles O2/mole Mn |
| MnO on activated carbon (Example 1) | 0.21 | 0.105 |
| Unsupported MnO (Example 2) | 0.23 | 0.016 |

The results of Examples 1 and 2 show that the supported MnO adsorbent has a higher $O_2$ capacity based on the total weight of Mn available when compared with the unsupported Mn catalyst. This may be related to the fact that the MnO particle size in the supported adsorbent is much smaller than the particle size of the unsupported MnO. Since it is expected that the removal of $O_2$ is limited to surface MnO molecules, smaller MnO particles are preferred because the smaller particles have more surface MnO molecules available for reaction with $O_2$. $CO_2$ surface area measurements were conducted on both $Cs_2O$ and MnO activated carbon-supported adsorbents. Both these materials showed metal oxide particle sizes of 5 to 10 nm. On the other hand, the MnO particle size in the unsupported bulk oxide is on the order of 1 micron (1000 nm). The results of Examples 1 and 2 show that supported, small particle MnO has improved $O_2$ capacity based on the total metal oxide available.

EXAMPLE 3

A supported MnO adsorbent material was produced by impregnating 50 grams of activated alumina (Alcan AA-300) with 18 cc of 50 wt % $Mn(NO_3)_2$ solution. The material was air dried at 70° C. and activated in 4% $H_2$ in $N_2$ at 400° C. for 16 hours. The resulting material had a Mn loading of 1.2 mmole/g. An $O_2$ capacity of 0.078 mmole/g adsorbent was measured in a standard volumetric adsorption apparatus at 30° C., and this corresponded to a molar ratio of $O_2$ to Mn of 0.065. While this value is lower than that measured on the carbon-based adsorbent, the alumina-based adsorbent still has a higher $O_2$/Mn ratio than bulk MnO (4.6 times higher), indicating the enhanced ability of finely dispersed, small particles MnO to adsorb $O_2$. The alumina-based getter has the added advantage that is a good desiccant and therefore can simultaneously adsorb water and $O_2$.

EXAMPLE 4

1.76 g of the activated carbon-supported MnO adsorbent of Example 1 was ground to 16–20 mesh (1.19–0.84 mm) and packed into a stainless steel vessel 5 cm in length having a 0.85 cm inside diameter. The vessel had 9 sample taps along its length. Breakthrough data were collected from the 5$^{th}$ sample tap (2.5 cm from the vessel inlet). The vessel was heated at 345° C. in $N_2$ for 14 hours to reactivate the adsorbent. After vacuuming to remove residual $N_2$ from the adsorbent, an ammonia stream containing 0.45 ppmv oxygen and 0.38 ppmv water was passed through the vessel at a flow rate of 250 sccm. The system was operated under 6.7 atm pressure and ambient temperature (about 25° C.). The outlet oxygen concentration was analyzed by gas chromatography with a discharge ionization detector (GC-DID) having a lower detection limit of 20 ppbv. As shown by the oxygen breakthrough data in FIG. 1, the initial outlet oxygen concentration from the vessel was below the lower GC detection limit. Under these breakthrough test conditions, the adsorbent had a dynamic oxygen capacity of 0.21 mmole/g adsorbent.

Figure 2:
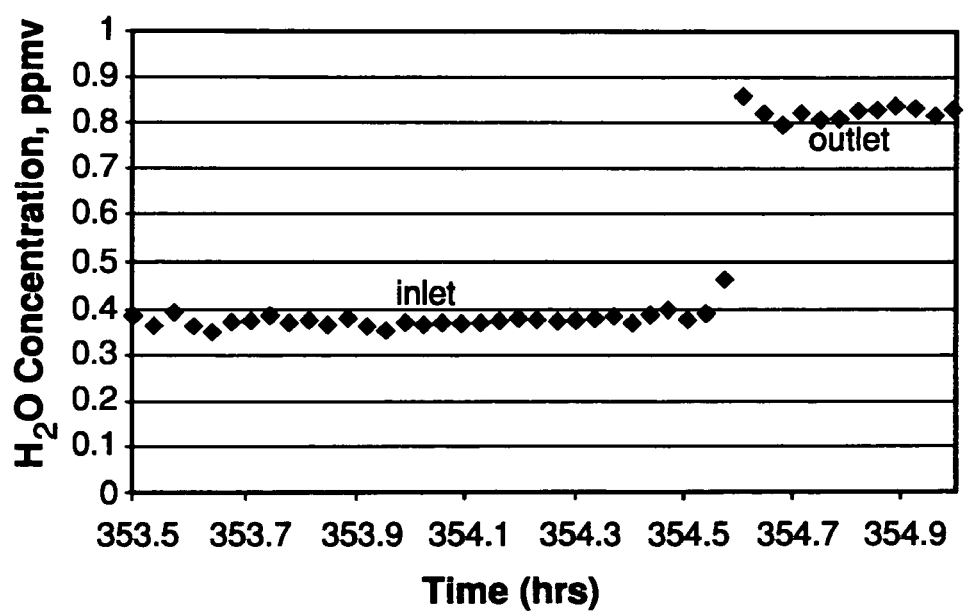
FIG. 2 is a plot of inlet and outlet water concentration during the oxygen breakthrough of FIG. 1.

The outlet water concentrations were determined by a Fourier Transform Infrared (FTIR) analyzer having a lower detection limit of 40 ppb water. As shown in FIG. 2, during breakthrough about 0.45 ppm water was actually generated in the vessel. Although the mechanism of this water generation is not fully understood, it is believed that water was generated by the reaction between $NH_3$ and the metal oxide that adsorbed oxygen from the ammonia. To ensure that the total impurities are maintained below 100 ppbv, a desiccant is required in combination with the $O_2$ removal adsorbent as earlier discussed.

EXAMPLE 5

Figure 3:
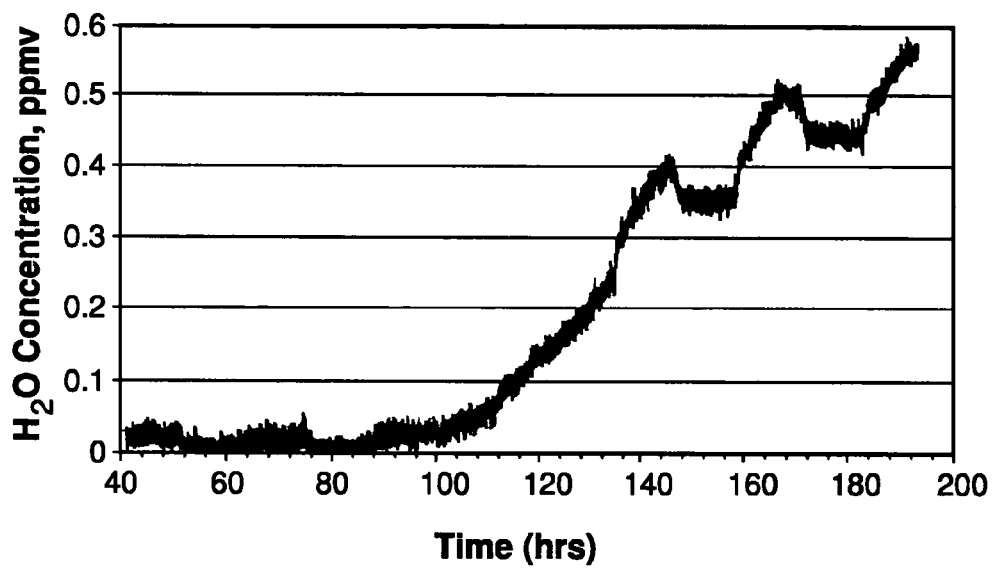
FIG. 3 is a water breakthrough curve for the adsorption of water on bulk MnO from a mixture of 0.5 ppmv oxygen and 0.2 ppmv water from ammonia.

The bulk MnO catalyst described in Example 2 was ground to 16–20 mesh (1.19–0.84 mm) and 0.79 g of the ground material was packed into a stainless steel vessel with a 0.85 cm inside diameter and a 5 cm length. There were no sample taps. An ammonia stream containing 0.5 ppmv oxygen and 0.2 ppmv water was passed through the vessel at 250 sccm under 6.7 atm pressure and ambient temperature. The outlet $H_2O$ concentration profile from the vessel is shown in FIG. 3 and indicates that the bulk MnO initially removed $H_2O$. Following breakthrough at about 130 hr, generation of $H_2O$ was observed and the outlet concentration reached a level of about 0.5 ppmv. The generation of $H_2O$ under these conditions was not recognized in the prior art when reduced metal oxide was used. This finding is critical to ensure a maximum level of 100 ppbv of total impurities in purified $NH_3$. As a result of the $H_2O$ generation, a desiccant is required in combination with the $O_2$/$CO_2$ removal adsorbent as earlier discussed.

EXAMPLE 6

Using an incipient wetness technique, 40 grams of activated carbon (Type PSC from Calgon) was impregnated with 28 ml of an aqueous solution containing 20 g of cesium formate. The mixture was dried at 110° C. for 16 hr and activated at 300° C. in $N_2$ for 16 hr. The metal oxide loading was about 30% by weight. A standard volumetric adsorption unit was used to measure the adsorption of oxygen on this adsorbent. At an oxygen partial pressure of 0.0002 atm, the oxygen capacity on the adsorbent was 0.15 mmole/g adsorbent. The spent adsorbent was regenerated at 300° C. in flowing nitrogen at 2 cc/g-min and oxygen adsorption was repeated as above. The regeneration-adsorption cycle was repeated four more times. The resulting uptake data in Table 3 indicate that the oxygen capacity is regained following each regeneration of the adsorbent.

EXAMPLE 7

Figure 4:
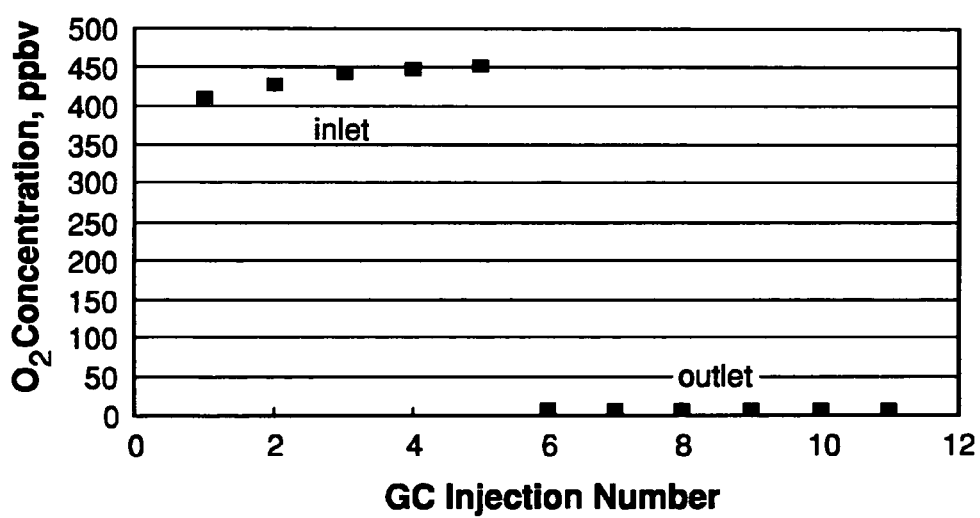
FIG. 4 is a plot of oxygen concentration at the inlet and outlet of an adsorber containing $Cs_2O$ impregnated activated carbon with a feed gas mixture of 0.45 ppmv oxygen and 0.38 ppmv water in ammonia.

A sample of the activated carbon-supported $Cs_2O$ adsorbent prepared in Example 6 was ground to 16–20 mesh (1.19–0.84 mm) and 0.79 gram of the ground adsorbent was packed into a stainless steel vessel having a 0.85 cm inside diameter and a length of 5 cm. The vessel had no sample taps. The adsorbent was activated by heating at 250° C. for 12 hours in 250 sccm $NH_3$ flow. The same impure ammonia stream as in Example 4 was passed through the vessel at 250 sccm under 6.7 atm pressure and ambient temperature, and the outlet $O_2$ concentration was measured by GC. The initial outlet $O_2$ concentration from the vessel was below the GC lower detection limit of 20 ppbv. FIG. 4 indicates the concentration change from the inlet and the outlet of the vessel packed with the activated carbon-supported $Cs_2O$, confirming that $O_2$ was effectively removed by this adsorbent. As observed in previous examples, $H_2O$ was generated when the ammonia stream was passed through the adsorbent.

TABLE 3

Oxygen Uptake vs Time For
Successively Regenerated $Cs_2O$ on Activated Carbon
(Uptake as Amount Adsorbed/Amount Adsorbed at Equilibrium)

| Time (min.) | Initial Isotherm | First Regeneration | Second Regeneration | Third Regeneration | Fourth Regeneration |
|---|---|---|---|---|---|
| 0.5 | 0.473 | 0.475 | 0.521 | 0.478 | 0.480 |
| 0.75 | 0.602 | 0.603 | 0.611 | 0.576 | 0.608 |
| 1.0 | 0.678 | 0.679 | 0.685 | 0.674 | 0.694 |
| 1.5 | 0.786 | 0.786 | 0.771 | 0.760 | 0.776 |
| 2.0 | 0.847 | 0.846 | 0.859 | 0.839 | 0.853 |
| 5.0 | 0.965 | 0.963 | 0.939 | 0.948 | 0.952 |
| 10.0 | 0.990 | 0.988 | 0.966 | 0.975 | 0.977 |
| 20.0 | 0.994 | 0.992 | 0.983 | 0.990 | 0.987 |
| 30.0 | 0.998 | 0.996 | 0.992 | 0.994 | 0.992 |

EXAMPLE 8

Using a standard volumetric adsorption apparatus, the adsorption of $CO_2$ on the activated carbon-supported $Cs_2O$ described in Example 6 was conducted at 30° C. At a $CO_2$ pressure of 0.0037 atm, the $CO_2$ capacity was 0.17 mmole $CO_2$/gram of adsorbent. The $CO_2$ capacity for the untreated activated carbon at the same conditions was 0.013 mmole $CO_2$/g of adsorbent. Clearly, the impregnation of the carbon support with the metal oxide greatly increases the $CO_2$ capacity of the material. This result confirms that these supported metal oxides can also be used for trace $CO_2$ removal.

The invention claimed is:

1. In a process for purifying a hydride gas by removing contaminant oxygen from said hydride gas which comprises the step of contacting said hydride gas with a reduced metal oxide, the improvement which comprises:

contacting said hydride gas with a reduced metal oxide carried on a porous support, wherein the reduced metal oxide carried on the porous support is selected from the group consisting of manganese oxide impregnated on porous carbon, manganese oxide impregnated on porous activated alumina, an alkali metal oxide impregnated on porous activated alumina, and an alkaline earth metal oxide impregnated on porous activated alumina.

2. The process of claim 1 wherein the alkali metal is selected from the group consisting of cesium, potassium and sodium.

3. The process of claim 1 wherein a desiccant is employed to assist in the removal of water, if generated, in the removing of the contaminant oxygen.

4. The process of claim 1 wherein the metal oxide is manganese oxide and the manganese oxide is impregnated on activated alumina.

5. The process of claim 1 wherein the metal oxide is manganese oxide, the manganese oxide is impregnated on a carbon support, and a desiccant is included to remove any water that may be generated during the removing of the contaminant oxygen.

* * * * *